United States Patent

Horng

[11] Patent Number: 6,097,120
[45] Date of Patent: Aug. 1, 2000

[54] BRUSHLESS D.C. MOTOR ASSEMBLY

[75] Inventor: Alex Horng, Kaohsiung, Taiwan

[73] Assignee: Sunonwealth Electric Machine Industry Co., Ltd., Kaohsiung, Taiwan

[21] Appl. No.: 09/327,188

[22] Filed: Jun. 7, 1999

[30] Foreign Application Priority Data

Sep. 4, 1999 [TW] Taiwan .................................. 88205613
Nov. 3, 1999 [TW] Taiwan .................................. 88203772

[51] Int. Cl.[7] ...................................................... H02K 7/09
[52] U.S. Cl. ...................... 310/90.5; 310/156; 310/68 B; 310/168; 310/67 R; 310/191; 310/89
[58] Field of Search .................................. 310/90.5, 156, 310/68 B, 168, 67 R, 191, 89

[56] References Cited

U.S. PATENT DOCUMENTS

| | | | |
|---|---|---|---|
| 4,900,961 | 2/1990 | Kudo et al. ................................ | 310/90 |
| 5,235,228 | 8/1993 | Nakanura et al. ......................... | 310/51 |
| 5,355,373 | 10/1994 | Salmon et al. ............................ | 310/71 |
| 5,410,201 | 4/1995 | Tanaka et al. ........................ | 310/68 B |
| 5,689,147 | 11/1997 | Kaneda et al. ........................... | 310/216 |
| 5,717,268 | 2/1998 | Carrier et al. ........................... | 310/156 |
| 5,847,483 | 12/1998 | Suzuki et al. ............................ | 310/156 |

*Primary Examiner*—Nestor Ramirez
*Assistant Examiner*—Thanh Lam
*Attorney, Agent, or Firm*—Bacon & Thomas, PLLC

[57] ABSTRACT

A brushless D.C. motor assembly includes a balancing sheet made of material with magnetic conductivity, the balancing sheet having an axle hole joined together with a stator by an axle tube, a rotor rotatably received in the axle tube, the rotation thereof controlled by a controlling device, and the rotor having a annular permanent magnet with a diameter substantially the same as the diameter of the balancing sheet wherein the permanent magnet and the balancing sheet attract each other.

21 Claims, 12 Drawing Sheets

BRUSHLESS D.C. MOTOR ASSEMBLY

BACKGROUND OF THE INVENTION

1. Field of the Invention

The present invention relates to a brushless D.C. motor assembly, and more particularly to a rotor thereof, in a poised position with more stable rotational movement.

2. Description of the Related Art

A conventional brushless D.C. motor assembly comprises a rotor provided with an axle rotatably supported by several bearings disposed within an axle tube of a stator such that the rotor can rotate smoothly.

For the sake of the requirement of assembly, a gap is formed between the axle and the bearing after the assembly of the motor assembly. Although the gap is very small, the centrifugal force still can make the axle slant slightly when the axle is loaded with the weight of the permanent magnet, the blade, the wheel or other burden to rotate such that the contact between the axle and the bearing becomes uneven. Accordingly, after a long term of use, the gap will increase gradually such that the slant angle of the rotating axle is becoming bigger, thereby bringing the problems of deflection, vibration, friction, noise, etc.

SUMMARY OF THE INVENTION

The inventor of the present invention has been working in the field of manufacturing the brushless D.C. motor, which is widely applied to the CD ROM, disk drive, heat dissipating fan of the CPU, and other products of precise technology.

Given the problems described above and as the requirement of product quality becomes more and more stringent, it is a primary object of the present invention to provide a brushless D.C. motor assembly including a balancing sheet mounted on a fixed body, wherein the balancing sheet is made of material with magnetic conductivity, a annular body extended from magnet pole plates, to create a corresponding attraction with the permanent magnet of the stator, providing a balancing force to assure stable rotation of the rotor, reducing vibration and noise occurring in the rotation of the rotor whereby the working life of the motor can be extended.

It is another object of the present invention to provide a brushless D.C. motor assembly having an integrally formed annular body extending from the pole piece thereof, wherein the annular permanent magnet of the rotor and the annular body attract each other, providing a balancing force to assure stable rotation of the rotor, preventing vibration and noise occurring during rotation of the rotor, whereby the working life of the motor can be extended.

The object of the present invention described above is achieved by providing a brushless D.C. motor assembly mainly comprising a stator, a rotor and a balancing sheet made of material with magnetic conductivity for creating a corresponding attraction with the permanent magnet of the stator, providing a balancing force which assures a balanced position and stable rotation of the rotor.

The present invention further provides a brushless D.C. motor assembly mainly comprising a stator, a rotor and an integrally formed annular body extending from the pole piece made of material with magnetic conductivity for creating a corresponding attraction with the permanent magnet of the stator, providing a balancing force which assures a balanced position and stable rotation of the rotor.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
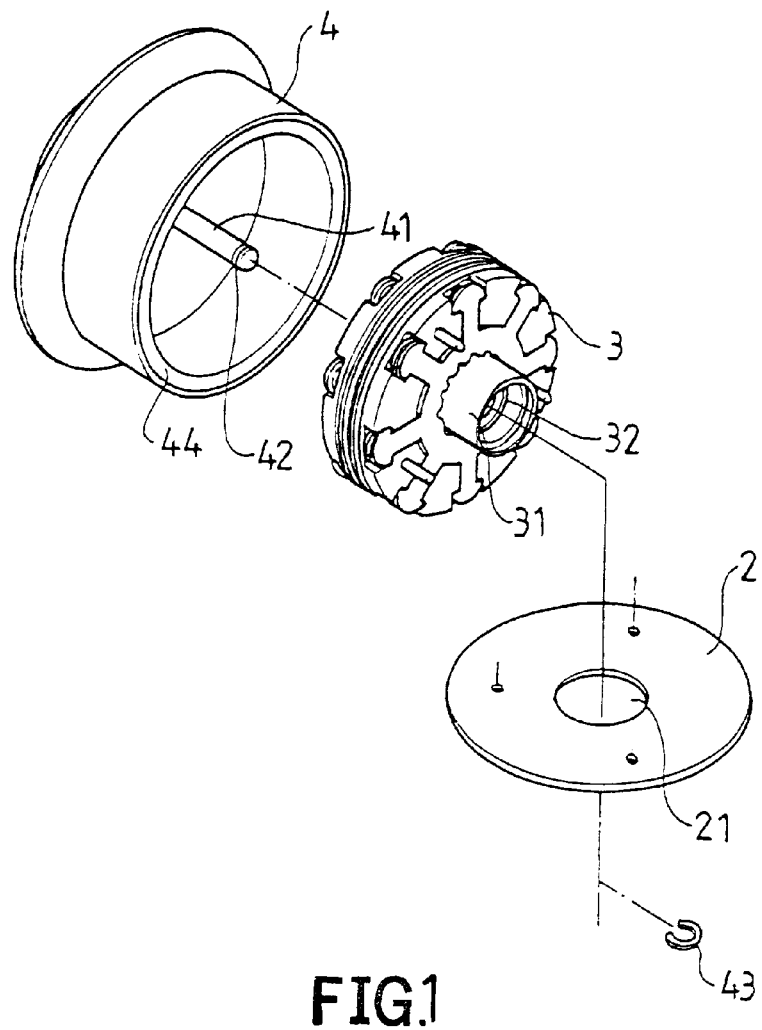
FIG. 1 is an exploded perspective view of a first embodiment in accordance with the present invention.

FIG. 1 is a first embodiment in accordance with the present invention mainly comprising a balancing sheet 2, a stator 3, a rotor 4.

The balancing sheet 2 is made of material with magnetic conductivity which can be mounted in a suitable position via any conventional way. The balancing sheet 2 includes an axle hole 21 joined together with a stator 3 by an axle tube 31.

The stator 3 may be designed with a variable number of poles and formed via a variety of winding methods. The stator 3 joins to the axle tube 31 in the center thereof. The axle tube 31 can be joined to the balancing sheet 2 and mounted to a suitable fixing body. The axle tube 31 is provided with at least one bearing or rotatably supporting device such as a rotation supporting element 32, for rotatably supporting the axle shaft 41 of the rotor 4.

The rotor 4 is provided with an axle shaft 41 in the center thereof. The axle shaft 41 is rotatably supported by the rotation supporting element 32 in the stator 3 and provided with an annular groove 42 retained by a C-shaped ring such as a locking device 43 to ensure that the rotor 4 is retained in place. The rotor 4 is provided with an annular permanent magnet 44 and the diameter thereof is preferably approximate to the diameter of the balancing sheet 2, so that the permanent magnet 44 and the balancing sheet 2 attract each other, and the gap therebetween remains relatively very small.

Figure 2:
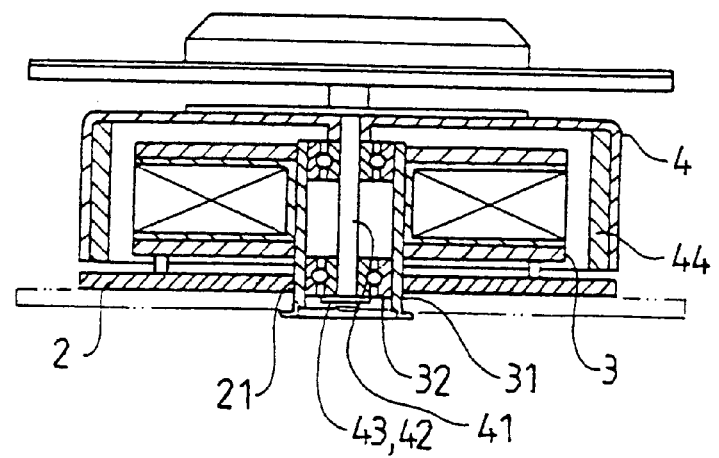
FIG. 2 is a sectional view of the first embodiment in accordance with the present invention.

FIG. 2 is a first embodiment in accordance with the present invention, illustrated in assembled status wherein the stator 3 is joined to the balancing sheet 2, which is mounted to a suitable fixing body by the axle tube 31 of the stator 3. The axle shaft 41 of the rotor 4 is rotatably supported by the rotation supporting element 32 of the stator 3. The permanent magnet 44 of the rotor 4 corresponds to the balancing sheet 2 The rotor 4 can be activated to rotate via the control of conventional controlling device such as a circuit board and a Hall sensor, and the balancing attraction generated between the permanent magnet 44 and balancing sheet 2 can put the rotor 4 in a poised position, allowing it to rotate stably, thereby preventing the generation of vibration and noise in the operation thereof, such that the working life of the motor can be extended.

Figure 3:
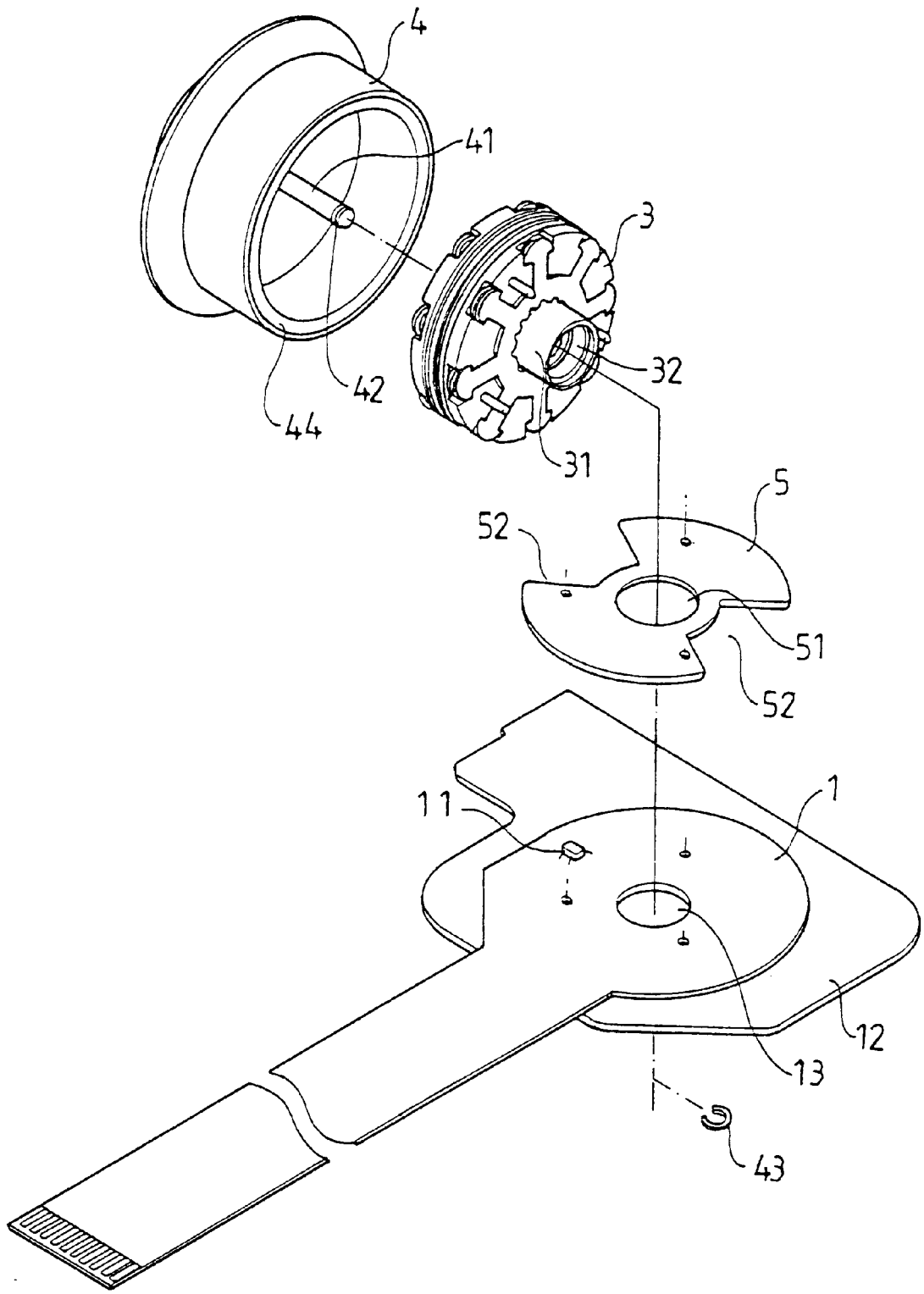
FIG. 3 is an exploded perspective view of a second embodiment in accordance with the present invention.

FIG. 3 is a second embodiment in accordance with the present invention mainly comprising a circuit board 1, a balancing sheet 5, a stator 3, a rotor 4.

The balancing sheet 5 is mounted on the circuit board 1 which can be made by SMT (surface mount technology), and the circuit board is provided with a sensor 11 and a variety of controlling devices such that the stator 3 joined therein can generate magnetic flux to drive the rotor 4 to rotate. In order to allow the circuit board 1 to be conveniently mounted to a suitable position, the circuit board can be optionally mounted to a fixing body 12, and the circuit board 1 and the fixing body 12 can be provided with the axle hole 13 for joining together with the stator 3 via the axle tube 31.

The balancing sheet 5 is made of material with magnetic conductivity can be mounted to a suitable position via any conventional way. The balancing sheet 5 includes an axle hole 51 joined together with a stator 3 by an axle tube 31. Besides, the balancing sheet 5 is provided with a notch 52 for receiving the sensor 11 wherein the balancing sheet 5 can be provided with notches preferably disposed symmetrical about the center line thereof.

The stator 3 may be designed with a variable number of poles and formed via a variety of winding methods. The stator 3 joins to the axle tube 31 in the center thereof. The axle tube 31 can be joined to the balancing sheet 5 and fixed at the fixing body 12 on which the circuit board 1 is mounted such that the balancing sheet 5 is disposed between the stator 3 and the circuit board 1. The axle tube 31 is provided with at least one bearing or rotatably supporting device such as a rotation supporting element 32 in the inner periphery thereof for rotatably supporting the axle shaft 41 of the rotor 4.

The rotor 4 is provided with an axle shaft 41 in the center thereof. The axle shaft 41 is rotatably supported by the rotation supporting element 32 in the stator 3 and provided with a annular groove 42 retained by a C-shaped ring such as a locking device 43 to ensure that the rotor 4 is retained in place. The rotor 4 is provided with a annular permanent magnet 44 and the diameter thereof is preferably approximate to the diameter of the balancing sheet 2, so that the permanent magnet 44 and the balancing sheet 2 attract each other, and the gap therebetween remains relatively very small.

Figure 4:
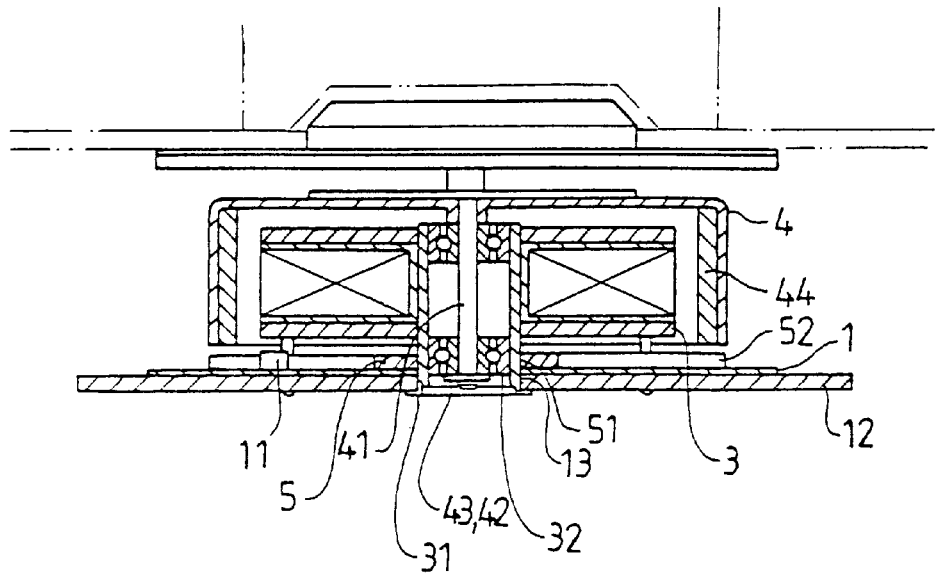
FIG. 4 is a sectional view of the second embodiment in accordance with the present invention.

FIG. 4 is a second embodiment in accordance with the present invention illustrated in assembled status wherein the stator 3 is joined together with the balancing sheet 5 through the axle hole 51 via the axle tube 31, which, in turn, is fitly received by the circuit board 1 and extends therethrough to join and fix with the fixing body 12. The axle shaft 41 of the rotor 4 is rotatably supported by the rotation supporting element 32 of the stator 3 and restricted by a C-shaped ring such as a locking device 43, retained at the annular groove 42 thereof such that the permanent magnet 44 of the rotor 4 corresponds to the balancing sheet 5 in such a way that the permanent magnet 44 and the balancing sheet 5 can attract each other, and the distance therebetween remains constant in such a way that there is no contact. When the rotor 4 is induced by the stator 3 to rotate, the attraction between the permanent magnet 44 and the balancing sheet 5 is fully balanced, which, in turn, can make the rotor 4 rotate stably thereby preventing the generation of vibration. Thus this motor assembly can be applied to CD ROM as the driver of compact discs, providing a stable rotation.

Figure 5:
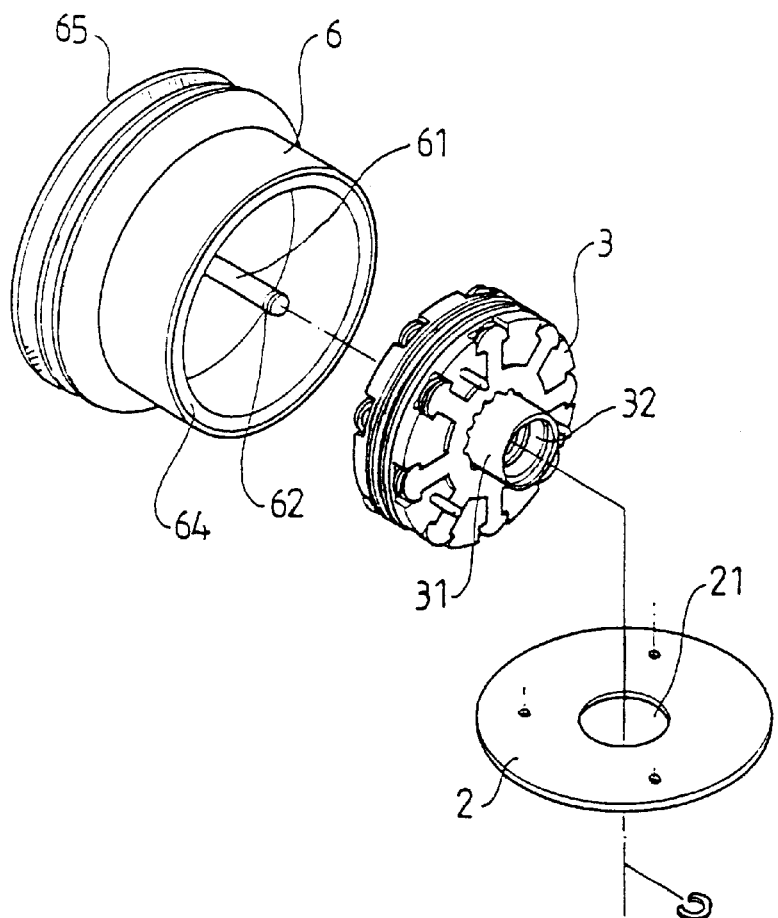
FIG. 5 is an exploded perspective view of a third embodiment in accordance with the present invention.

FIG. 5 is a third embodiment in accordance with the present invention mainly comprising a balancing sheet 2, a stator 3, a rotor 6.

The balancing sheet 2 is made of material with magnetic conductivity which can be mounted to a suitable position via any conventional way. The balancing sheet 2 includes an axle hole 21 joined together with a stator 3 by an axle tube 31. The balancing sheet 2 can be provided with a notch or notches in accordance with different requirements and joined to or separated from the circuit board 1.

The stator 3 may be designed with a variable number of poles and formed via a variety of winding methods. The stator 3 joins to the axle tube 31 in the center thereof. The axle tube 31 can be joined to the balancing sheet 2 and mounted to a suitable fixing body. The axle tube 31 is provided with at least one bearing or rotatably supporting device such as a rotation supporting element 32 therein for rotatably supporting the axle shaft 61 of the rotor 6.

The rotor 6 is provided with an axle shaft 61 in the center thereof. The axle shaft 61 is rotatably supported by the rotation supporting element 32 in the stator 3 and provided with a annular groove 62 retained by a C-shaped ring such as a locking device 43 to ensure that the rotor 6 is retained in place. The rotor 6 is provided with a annular permanent magnet 64 and the diameter thereof is preferably approximate to the diameter of the balancing sheet 2, so that the permanent magnet 44 and the balancing sheet 2 attract each other, and the gap therebetween remains relatively very small. Further, the rotor 6 includes an integrally formed transmission pulley 65 which can transmit power output via a transmission element such as belt.

Figure 6:
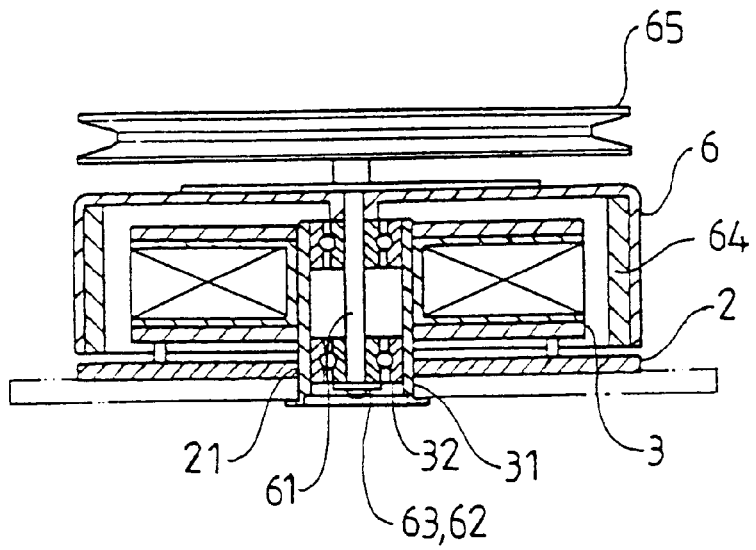
FIG. 6 is a sectional view of the third embodiment in accordance with the present invention.

FIG. 6 is a third embodiment in accordance with the present invention illustrated in assembled status wherein the stator 3 is joined to the balancing sheet 2, which is mounted to a suitable fixing body by the axle tube 31 of the stator 3.

The axle shaft 61 of the rotor 6 is rotatably supported by the rotation supporting element 32 of the stator 3. The permanent magnet 64 of the rotor 6 corresponds to the balancing sheet 2. The rotor 6 can be activated to rotate via the control of a conventional controlling device such as a circuit board and a Hall sensor. Since the distance between the permanent magnet 44 and the balancing sheet 5 remains constant, especially, when the rotor 6 is induced by the stator 3 to rotate, the permanent magnet 64 and the balancing sheet 2 can form a fully balanced attraction therebetween, which, in turn, can make the rotor 6 rotate stably and thus this motor assembly can be applied to a video cassette as a driver.

Figure 7:
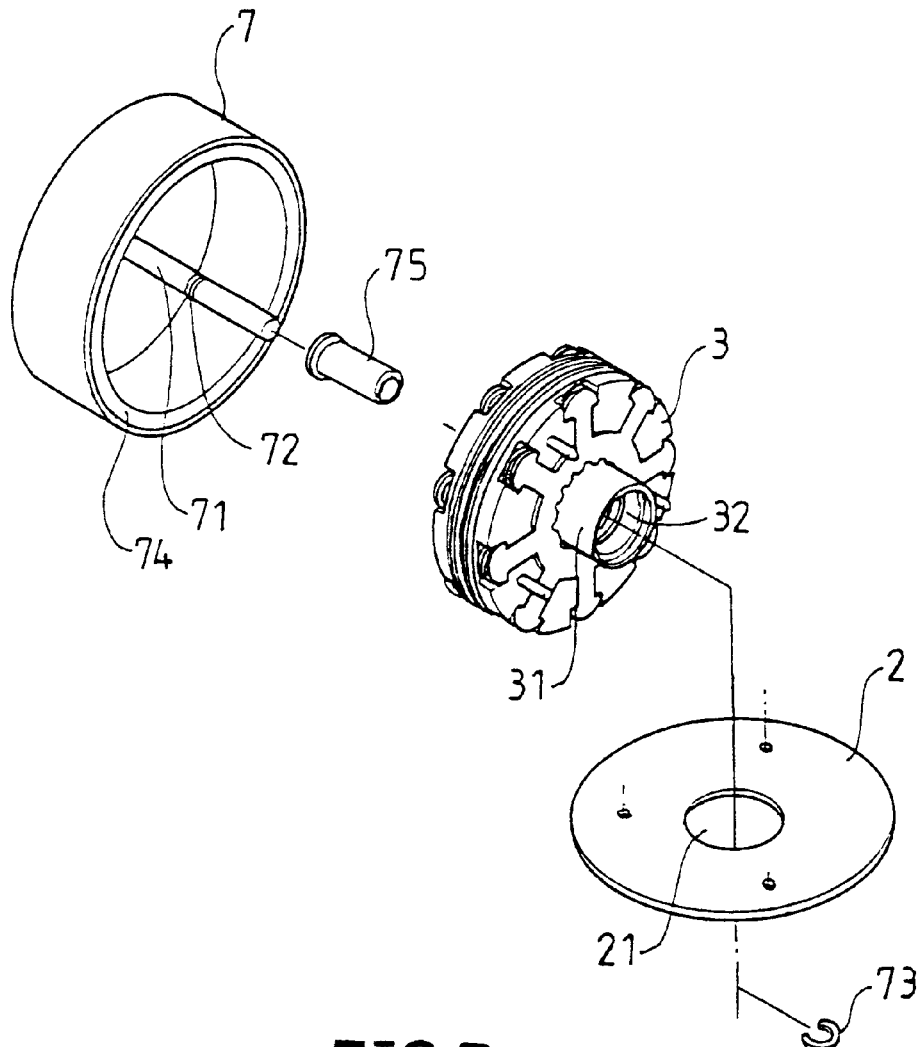
FIG. 7 is an exploded perspective view of a fourth embodiment in accordance with the present invention.

FIG. 7 is a fourth embodiment in accordance with the present invention mainly comprising a balancing sheet 2, a stator 3, a rotor 7.

The balancing sheet 2 made of material with magnetic conductivity can be mounted to a suitable position via any conventional way. The balancing sheet 2 includes an axle hole 21 joined together with a stator 3 by an axle tube 31. The balancing sheet 2 can be provided with a notch or notches in accordance with different requirements and joined to or separated from the circuit board 1.

The stator 3 may be designed with a variable number of poles and formed via a variety of winding methods. Stator 3 joins to the axle tube 31 in the center thereof. The axle tube 31 can be joined to the balancing sheet 2 and mounted to a suitable fixing body. The axle tube 31 is provided with at least one bearing or rotatably supporting device such as a rotation supporting element 32 therein for rotatably supporting the axle shaft 71 of the rotor 7.

The rotor 7 is provided with an axle shaft 71 in the center thereof. The axle shaft 71 is rotatably supported by the rotation supporting element 32 in the stator 3 and provided with an annular groove 72 retained by a C-shaped ring such as a locking device 73 to ensure that the rotor 6 is retained in place. The rotor 7 is provided with an annular permanent magnet 74 and the diameter thereof preferably approximate to the diameter of the balancing sheet 2, wherein the permanent magnet 44 and the balancing sheet 2 attract each other, and the gap therebetween remains relatively very small wherein the axle shaft 71 is elongated to be joined with a transmission element 75 such as a gear which can transmit power output from the axle shaft 71.

Figure 8:
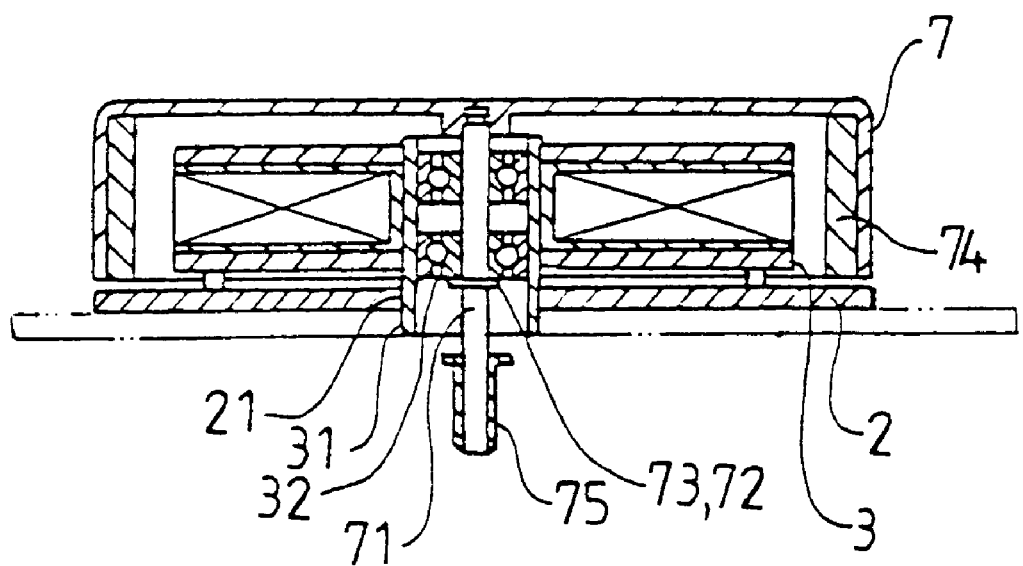
FIG. 8 is a sectional view of the fourth embodiment in accordance with the present invention.

FIG. 8 is a fourth embodiment in accordance with the present invention illustrated in assembled status wherein the stator 3 is joined to the balancing sheet 2, which is mounted to a suitable fixing body by the axle tube 31 of the stator 3. The axle shaft 71 of the rotor 7 is rotatably supported by the rotation supporting element 32 of the stator 3. The permanent magnet 74 of the rotor 7 corresponds to the balancing sheet 2. The rotor 7 can be activated to rotate via the control of a conventional controlling device such as a circuit board and a Hall sensor. When the rotor 7 is induced by the stator 3 to rotate, the permanent magnet 74 and the balancing sheet 2 can form a fully balanced attraction therebetween, which, in turn, can make the rotor 7 rotate stably and thus this motor assembly can be applied as a power output via gear transmission.

Figure 9:
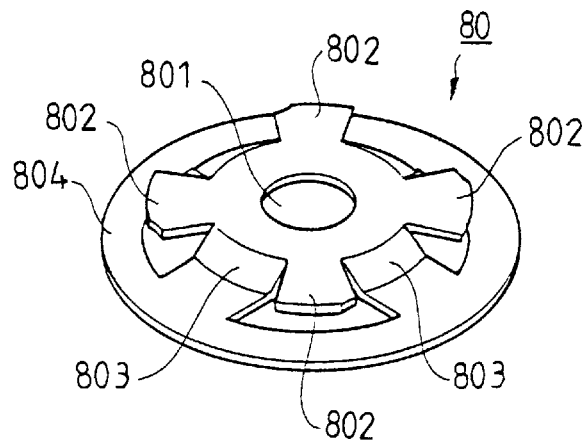
FIG. 9 is a perspective view of a pole piece used in a fifth embodiment in accordance with the present invention.

FIG. 9 illustrates a pole piece 80 made of material with magnetic conductivity used in a fifth embodiment in accordance with the present invention. The pole piece 80 has a hole 801 defined in the central portion thereof. The hole 801 can be provided for an axle tube disposed therein. The pole piece 80 has a plurality of pole edges 802 wherein the number thereof can be designed according to the number of poles desired. The pole piece 80 is provided with integrally formed connecting portions 803 between any two pole edges 802. The connecting portions 803 extend away from the hole 801 and support an annular body 804 at the end thereof. The diameter of the annular body 804 is the largest diameter of the pole piece 80. The annular body 804 is parallel to the pole piece 80 but not coplanar therewith.

Figure 10:
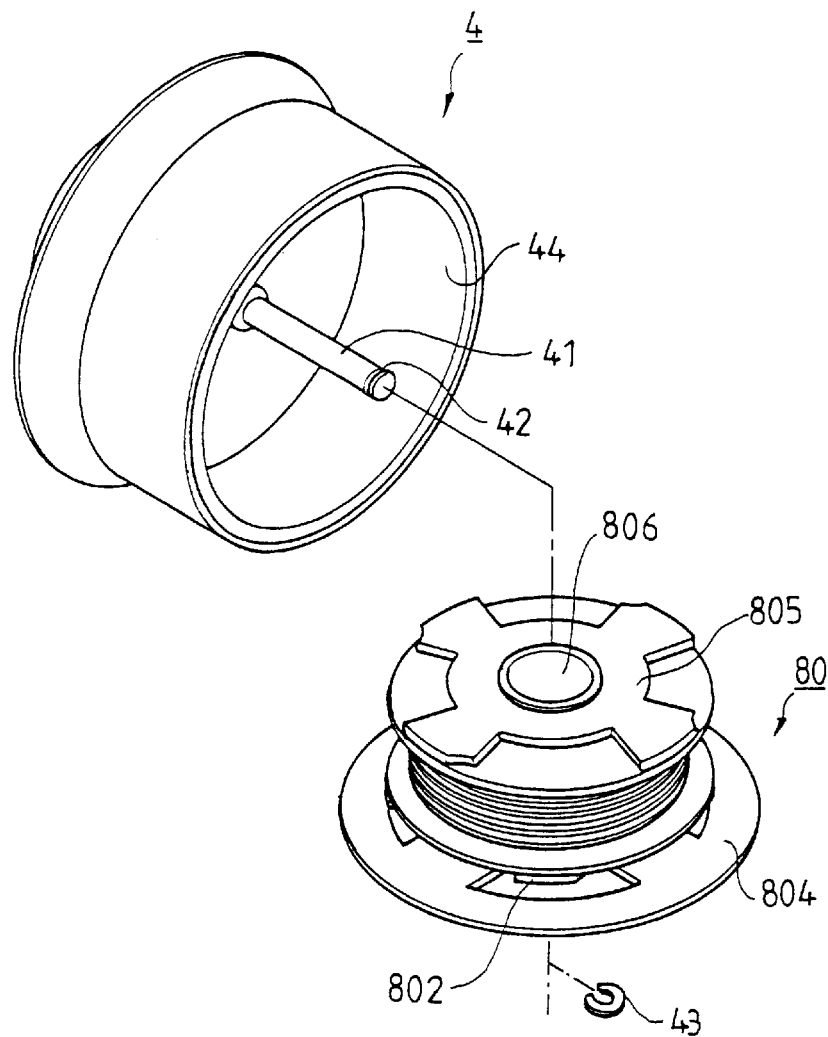
FIG. 10 is an exploded perspective view of the fifth embodiment in accordance with the present invention.
Figure 11:
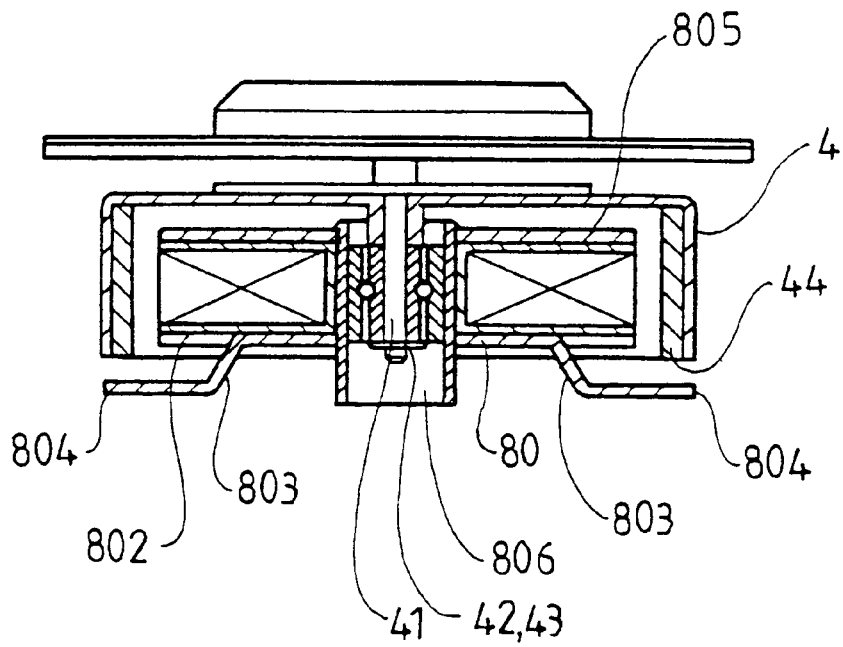
FIG. 11 is a perspective view of the fifth embodiment in accordance with the present invention.

FIG. 10 and FIG. 11 is the fifth embodiment in accordance with the present invention wherein the pole piece 80 and a pole piece 805 have a coil wound therebetween, thereby forming a stator. The stator has a axle hole 806 defined therein. The axle shaft 41 of the rotor 4 can be rotatably supported in the axle hole 806 via any conventional means.

Referring to FIG. 11, the rotor 4 is assembled with the stator wherein the annular permanent magnet 44 of the rotor 4 and the annular body 804 of the pole piece 80 attract each other but have no contact therebetween.

Figure 12:
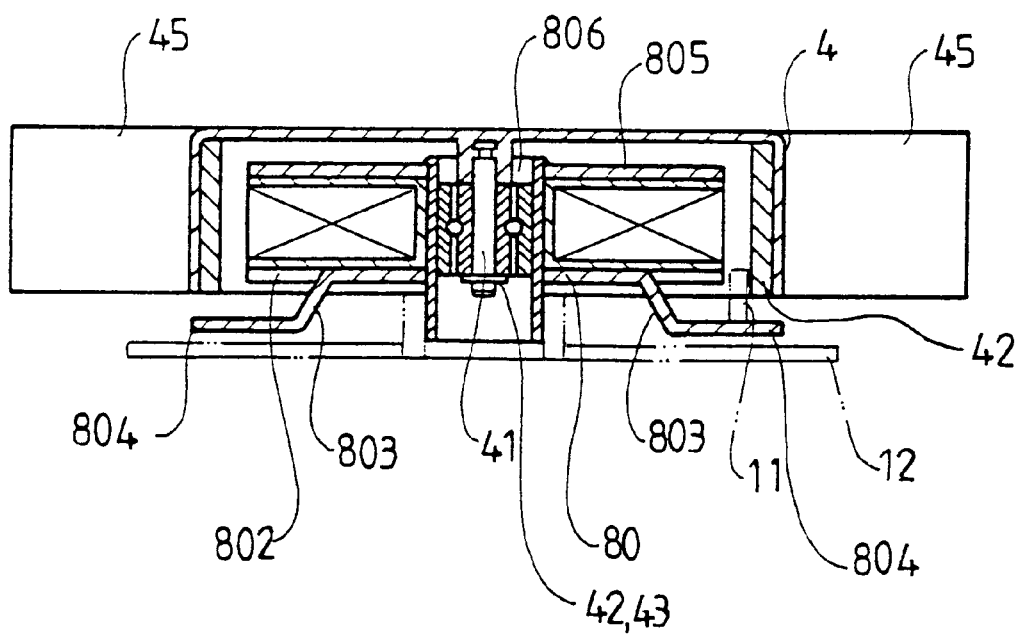
FIG. 12 is a perspective view of the fifth embodiment with blades disposed on the rotor thereof in accordance with the present invention.

FIG. 12 is the fifth embodiment with blades 45 disposed on the rotor thereof in accordance with the present invention wherein the stator is mounted to a fixing body 12, a sensor 11 is provided thereon, and blades 45 are disposed on the periphery of the rotor 4 thereby forming a heat dissipating fan.

Figure 13:
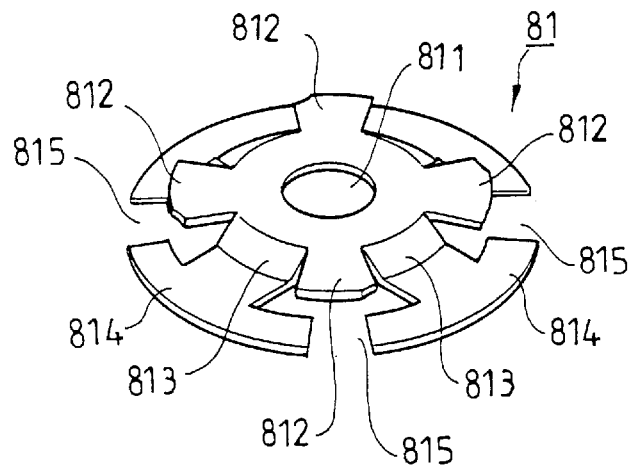
FIG. 13 is a perspective view of a pole piece used in a sixth embodiment in accordance with the present invention.

FIG. 13 illustrates a pole piece 81 made of material with magnetic conductivity used in a sixth embodiment in accordance with the present invention. The pole piece 81 has a hole 811 defined in the central portion thereof. The hole 811 can be provided for a axle tube disposed therein. The pole piece 81 has a plurality of pole edges 812 wherein the number thereof can be designed according to the number of poles desired. The pole piece 81 is provided with integrally formed connecting portions 813 between any two pole edges 812. Each of the connecting portions 813 extends away from the hole 811 and respectively supports an annular piece 814 at the end thereof. There are gaps 815 or notches between adjacent annular pieces 814. Each of the annular pieces 814 as well as each of the gaps 815 or each of the notches is disposed symmetrically. The annular pieces 814 as well as the gaps 815 or the notches located in the symmetrical position are of the same size. Each of the annular pieces 814 is parallel to the pole piece 81 but not coplanar therewith.

Figure 14:
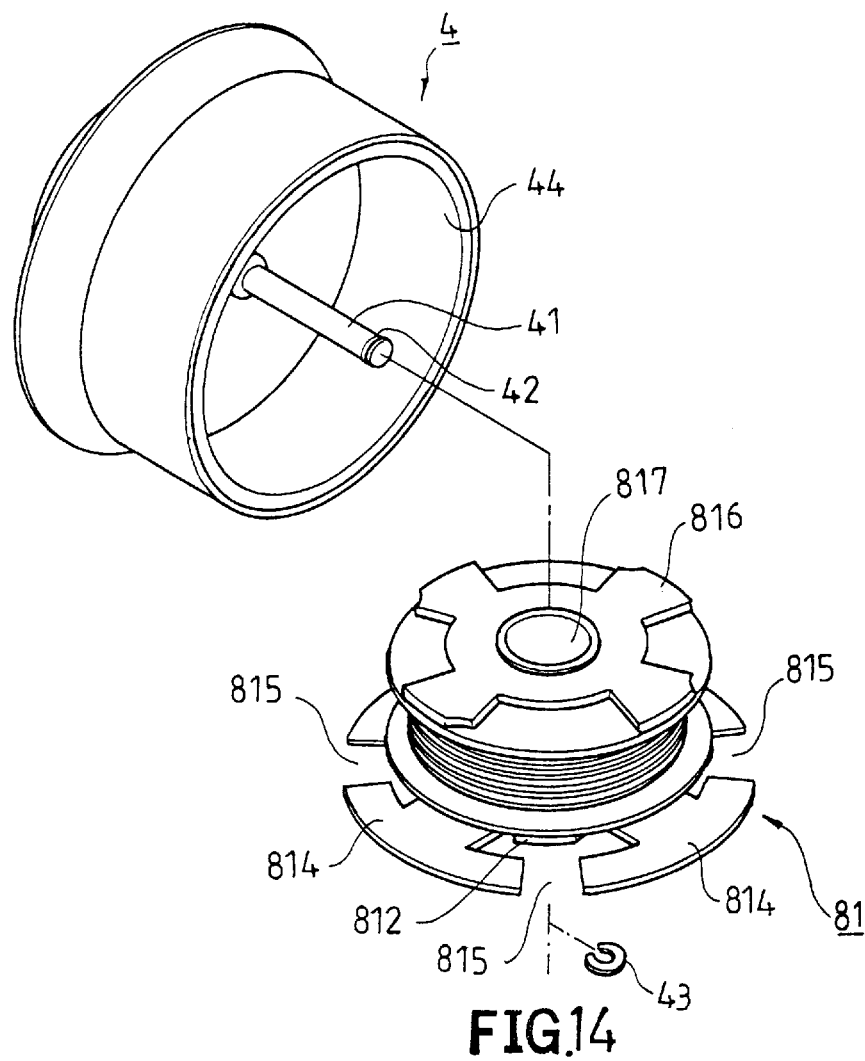
FIG. 14 is an exploded perspective view of the sixth embodiment in accordance with the present invention.

FIG. 14 is the sixth embodiment in accordance with the present invention wherein the pole piece 81 and a pole piece 816 have a coil wound therebetween, thereby forming a stator. The stator has an axle hole 817 defined therein. The axle shaft 41 of the rotor 4 can be rotatably supported in the axle hole 817 via any conventional means.

The rotor 4 is provided with an annular permanent magnet 44. Therefore, when the rotor 4 is rotatably supported in the stator having the pole piece 81, the annular permanent magnet 44 of the rotor 4 can have corresponding attraction with the annular pieces 814 of the pole piece 81 in such a way that there is no contact between them.

Figure 15:
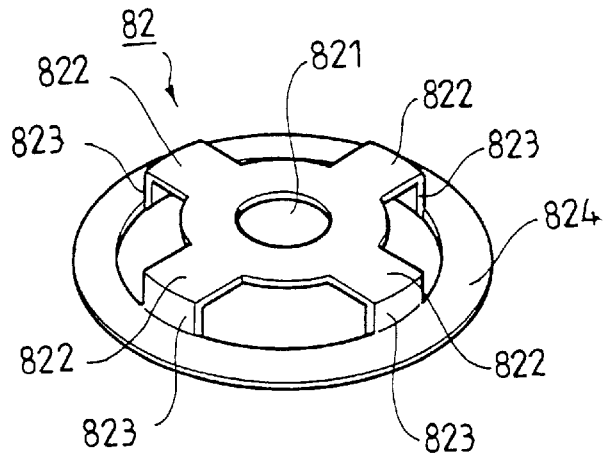
FIG. 15 is a perspective view of a pole piece used in a seventh embodiment in accordance with the present invention.

FIG. 15 illustrates a pole piece 82 made of material with magnetic conductivity used in a seventh embodiment in accordance with the present invention. The pole piece 82 has a hole 821 defined in the central portion thereof. The hole 821 can be provided for an axle tube disposed therein. The pole piece 82 has a plurality of pole edges 822 wherein the number thereof can be designed according to the number of poles desired. The pole piece 82 is provided with integrally formed connecting portions 823. The connecting portions 823 extend from the end of the pole edges 822 and support an annular body 824 at the end thereof. The diameter of the annular body 824 is the largest diameter of the pole piece 82. The annular body 824 is parallel to the pole piece 82 but not coplanar therewith.

Figure 16:
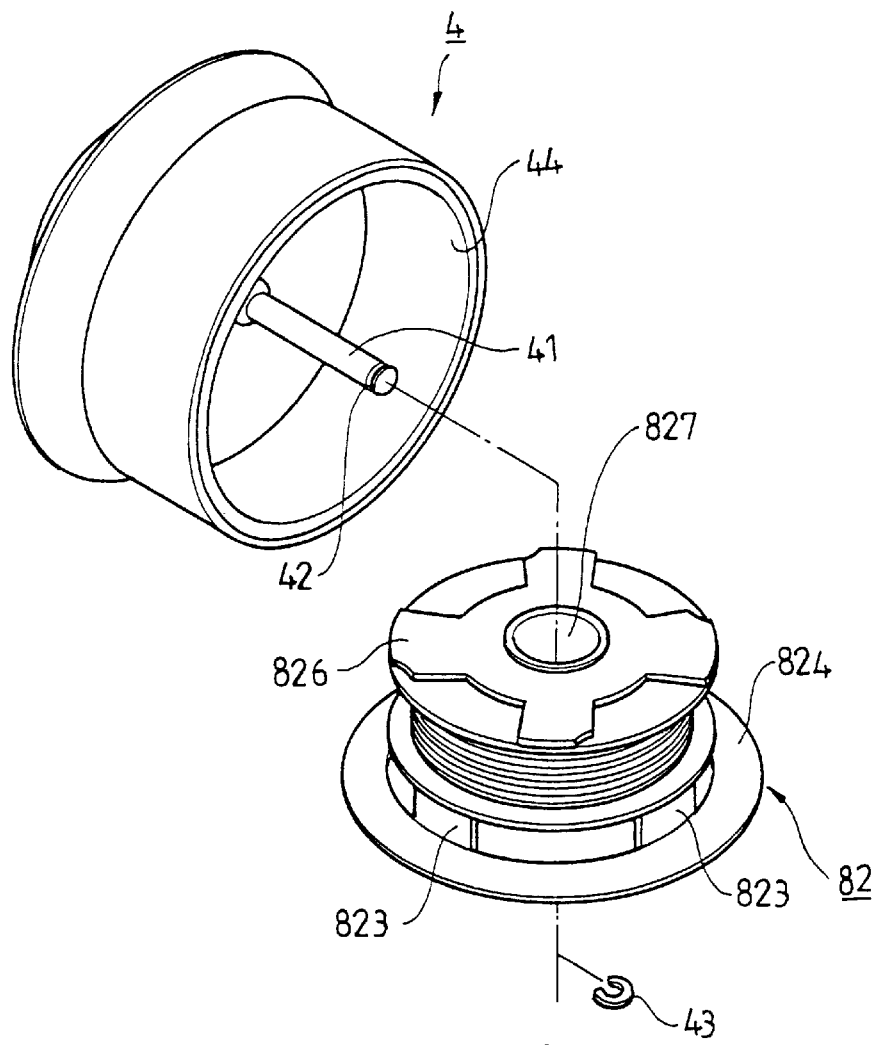
FIG. 16 is an exploded perspective view of the seventh embodiment in accordance with the present invention.
Figure 17:
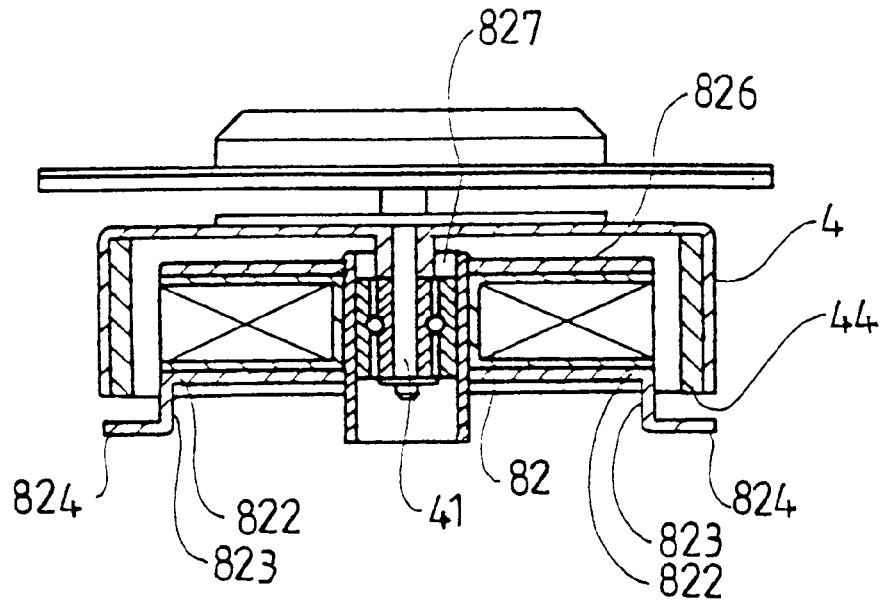
FIG. 17 is a perspective view of the seventh embodiment in accordance with the present invention.

FIG. 16 and FIG. 17 is the seventh embodiment in accordance with the present invention wherein the pole piece 82 and a pole piece 826 have a coil wound therebetween, thereby forming a stator. The stator has an axle hole 827 defined therein. The axle shaft 41 of the rotor 4 can be rotatably supported in the axle hole 827 via any conventional means.

Referring to FIG. 17, the rotor 4 is assembled with the stator wherein the annular permanent magnet 44 of the rotor 4 and the annular body 824 of the pole piece 82 attract each other but have no contact therebetween.

Figure 18:
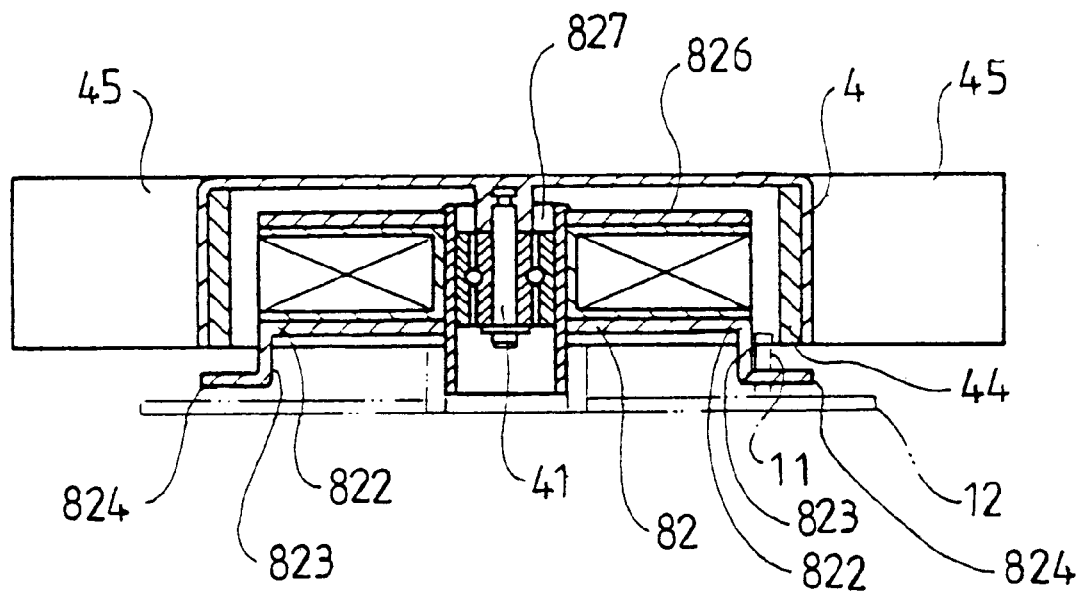
FIG. 18 is a perspective view of the seventh embodiment with blades disposed on the rotor thereof in accordance with the present invention.

FIG. 18 is the seventh embodiment with blades 45 disposed on the rotor thereof in accordance with the present invention wherein the stator is mounted to a fixing body 12, a sensor 11 is provided thereon, and blades 45 are disposed on the periphery of the rotor 4 thereby forming a heat dissipating fan.

Figure 19:
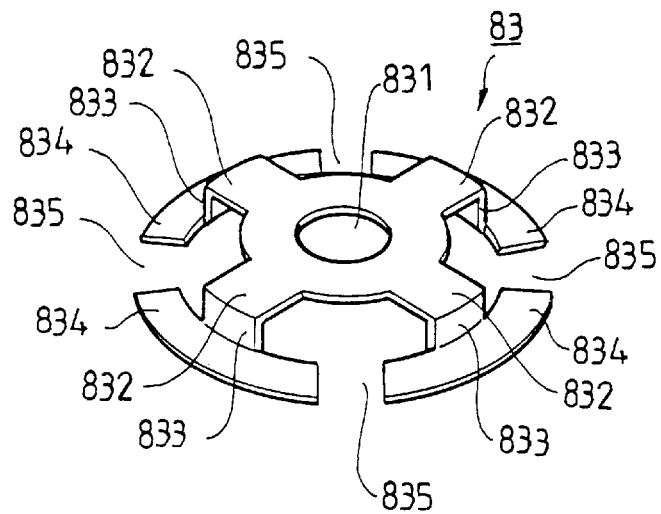
FIG. 19 is a perspective view of a pole piece used in a eighth embodiment in accordance with the present invention.

FIG. 19 illustrates a pole piece 83 made of material with magnetic conductivity used in a eighth embodiment in accordance with the present invention. The pole piece 83 has a hole 831 defined in the central portion thereof. The hole 831 can be provided for an axle tube disposed therein. The pole piece 83 has a plurality of pole edges 832 wherein the number thereof can be designed according to the number of poles desired. The pole piece 83 is provided with integrally formed connecting portions 833 extending from the end of the pole edges 832. Each of the connecting portions 833 respectively supports an annular piece 834 at the end thereof. There are gaps 835 or notches between adjacent annular pieces 834. Each of the annular pieces 834 as well as each of the gaps 835 or each of the notches is disposed symmetrically. The annular pieces 834 as well as the gaps 835 or the notches located in the symmetrical position are of the same size. Each of the annular pieces 834 is parallel to the pole piece 83 but not coplanar therewith.

Figure 20:
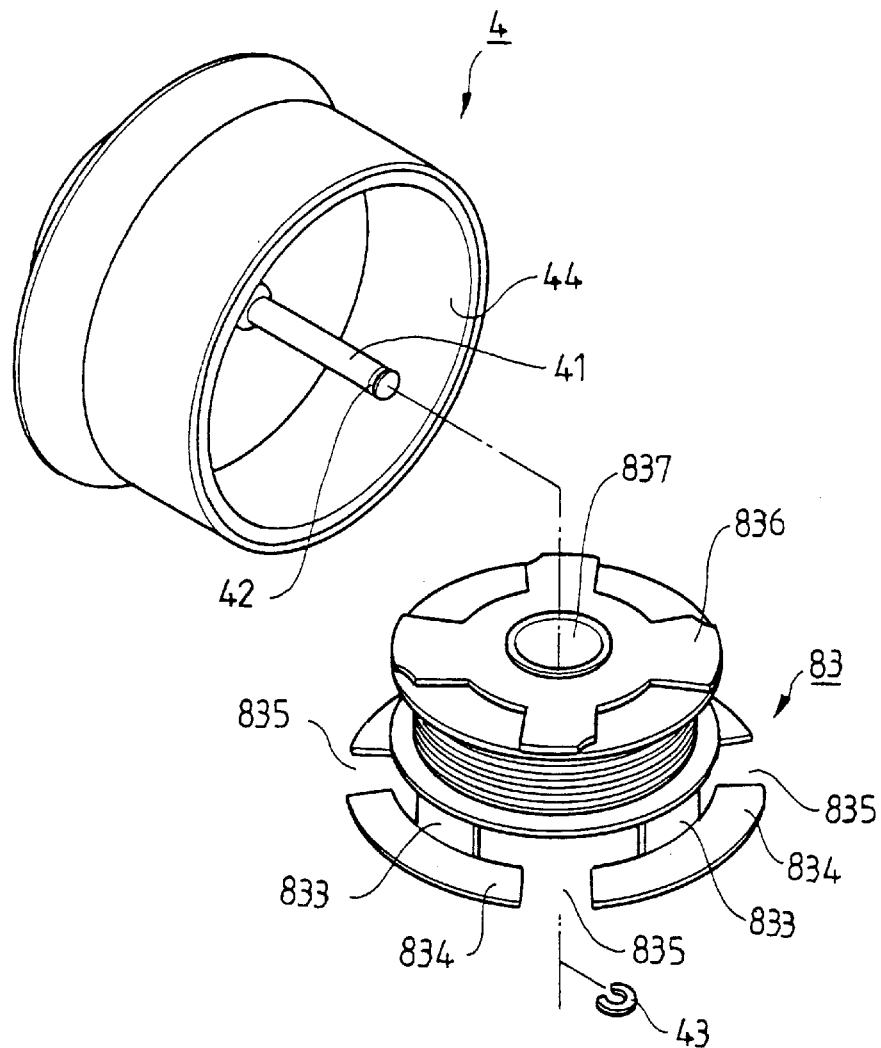
FIG. 20 is an exploded perspective view of the eighth embodiment in accordance with the present invention.

FIG. 20 is the eighth embodiment in accordance with the present invention wherein the pole piece 83 and a pole piece 836 have a coil wound therebetween, thereby forming a stator. The stator has a axle hole 837 defined therein. The axle shaft 41 of the rotor 4 can be rotatably supported in the axle hole 837 via any conventional means.

The rotor 4 is provided with an annular permanent magnet 44. Therefore, when the rotor 4 is rotatably supported in the stator having the pole piece 83, the annular permanent magnet 44 of the rotor 4 can have corresponding attraction with the annular body 834 of the pole piece 83 in such a way that there is no contact.

Figure 21:
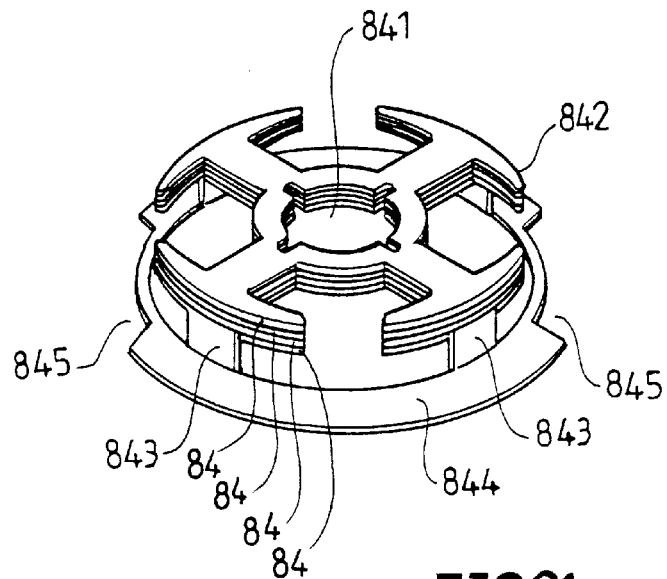
FIG. 21 is a perspective view of a set of pole pieces used in a ninth embodiment in accordance with the present invention.

FIG. 21 illustrates a set of pole pieces 84 made of material with magnetic conductivity used in a ninth embodiment in accordance with the present invention. Each of the pole pieces 84 has a hole 841 defined in the central portion thereof. The hole 841 can be provided for an axle tube disposed therein. Each pole piece 84 has a plurality of pole edges 842 wherein the number thereof can be designed according to the number of poles desired. One of the pole pieces 84 is provided with integrally formed connecting portions 843 extending from the end of the pole edges 842 thereof. Alternatively, the integrally formed connecting portions 843 may extend directly from one of the pole pieces itself. The connecting portions 843 support an annular body 844 at the end thereof. The diameter of the annular body 844 is the largest diameter of the pole piece 84. The annular body 844 is parallel to the pole piece 84 but not coplanar therewith. The annular body 844 may be provided with symmetrical notches 845. Alternatively, the annular body 844 may consist of several symmetrical discontinuous annular pieces or notches between adjacent annular plates 844.

Figure 22:
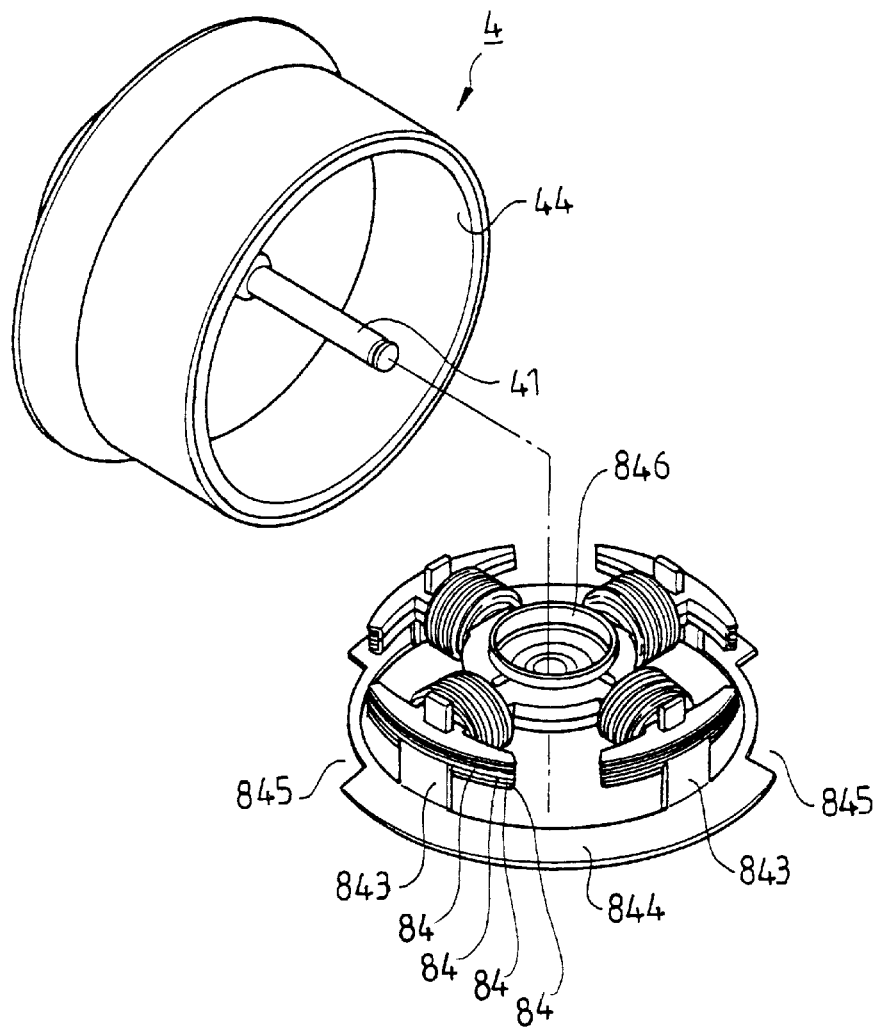
FIG. 22 is an exploded perspective view of the ninth embodiment in accordance with the present invention.

FIG. 22 is the ninth embodiment in accordance with the present invention wherein said set of pole pieces 84 has a coil wound thereon, thereby forming a stator. The stator has a axle hole 846 defined therein. The axle shaft 41 of the rotor 4 can be rotatably supported in the axle hole 846 via any conventional means.

The rotor 4 is provided with an annular permanent magnet 44. Therefore, when the rotor 4 is rotatably supported in the stator having said set of pole pieces 84, the annular permanent magnet 44 of the rotor 4 can have corresponding attraction with the annular body 844 in such a way that there is no contact.

The brushless D.C. motor assembly as defined in claim 1 is characterized in that the gap between the annular permanent magnet and the balancing sheet remains constant providing a corresponding attraction therebetween, which, in turn, can make the rotor be poised in position and rotate stably thereby preventing the occurrence of vibration and eccentric friction operation such that the noise of the motor is reduced and the working life thereof is extended.

The brushless D.C. motor assembly as defined in claim 9 is characterized in that the corresponding attraction between the annular permanent magnet of the rotor and the balancing sheet can make the rotor be poised in position and rotate stably wherein the rotor is further provided with an integrally formed transmission pulley which can transmit power output via a belt.

The brushless D.C. motor assembly as defined in claim 14 is characterized in that the corresponding attraction between the annular permanent magnet of the rotor and the balancing sheet can make the rotor be poised in position and rotate stably wherein the motor is further provided with an transmission element disposed on the axle shaft of the rotor for direct output of power.

The brushless D.C. motor assembly as defined in claim 2, 7, 12 and 17 is characterized in that the corresponding attraction between the annular permanent magnet of the rotor and the balancing sheet can make the rotor be poised in position and rotate stably. The balancing sheet is further provided with a notch for receiving a Hall sensor device disposed on a circuit board such that the Hall sensor device can be closer to the stator thereby controlling the activation of the rotor.

The brushless D.C. motor assembly as defined in claim 3, 8, 13 and 18 is characterized in that the gap between the annular permanent magnet and the balancing sheet remains constant providing a corresponding attraction therebetween, which, in turn, can make the rotor be poised in position and rotate stably. The balancing sheet is further provided with notches disposed symmetrically about the center line thereof wherein one of the notches can be provided for a Hall sensor disposed on a circuit board.

The brushless D.C. motor assembly as defined in claim 4, 10 and 15 is characterized in that the gap between the annular permanent magnet and the balancing sheet remains constant, providing a corresponding attraction therebetween, which, in turn, can make the rotor be poised in position and rotate stably. The balancing sheet is mounted between the stator and the circuit board such that the circuit board, the balancing sheet, the stator and the rotor can be integrally formed together.

The brushless D.C. motor assembly as defined in claim 5, 6, 11 and 16 is characterized in that the gap between the annular permanent magnet and the balancing sheet remains constant providing a corresponding attraction therebetween, which, in turn, can make the rotor be poised in position and rotate stably. Since the circuit board is joined to a fixing body such that even a circuit board made by SMT is flexible, the motor assembly still can be joined to the fixing body with proper hardness, providing ease of assembly.

The assembly as defined in claim 19 and 26 is characterized in that the annular permanent magnet of the rotor and the annular body of the pole piece have corresponding attraction therebetween in such a way that there is no contact, which, in turn, can make the rotor be poised in position and rotate stably thereby preventing the occurrence of eccentric rotation of the axle of the rotor such that problems of deflection, vibration, friction and noise can be prevented.

The assembly as defined in claim 20 and 27 is characterized in that the annular body or annular plate can be firmly supported thereby assuring the annular body or annular plate being parallel to the pole piece such that the annular permanent magnet of the rotor and the annular body or annular plate of the pole piece have corresponding attraction therebetween in a way of no contact, which, in turn, make the rotor rotate more smoothly.

The assembly as defined in claim 21 and 28 is characterized in that the pole edges of the pole piece are provided with larger thickness thereby increasing the area of induction.

The assembly as defined in claim 22 and 29 is characterized in that the diameter of the annular body is the largest diameter of the pole piece thereby assuring the annular permanent magnet corresponds to the annular body without contact such that the rotor can rotate very stably.

The assembly as defined in claim 23 and 30 is characterized in that the annular body is provided with notches symmetrical about the center line thereof for receiving the Hall sensor device such that the Hall sensor device can be placed in position with best induction thereby making the rotor rotate smoothly.

The assembly as defined in claim 24 and 31 is characterized in that the annular body may consist of several symmetrical discontinuous annular pieces which still can provide corresponding attraction with the annular permanent magnet of the rotor in such a way that there is no contact, which, in turn, can make the rotor be poised in position and rotate stably.

The assembly as defined in claim 25 is characterized in that the rotor is further provided with blades forming a blade wheel for driving circulation of air, thereby providing a heat-dissipating capability.

Although the invention has been explained in relation to its preferred embodiment, it is to be understood that many other possible modifications and variations can be made without departing from the spirit and scope of the invention as hereinafter claimed.

What is claimed is:
1. A brushless D.C. motor assembly, comprising:
   a balancing sheet made of material with magnetic conductivity, the balancing sheet having an axle hole and notches symmetrical about a center line of the axle hole;
   a stator joined together with the balancing sheet by an axle tube; and
   a rotor having an axle shaft rotatably received in the axle tube, rotation of the axle shaft being controlled by a controlling device, the rotor having an annular permanent magnet with a diameter substantially same as the diameter of the balancing sheet, wherein the permanent magnet and the balancing sheet attract each other, and a gap between the permanent magnet and the balancing sheet remains relatively very small.

2. A brushless D.C. motor assembly, comprising:
   a circuit board having a controlling device and an axle hole;
   a balancing sheet made of material with magnetic conductivity disposed on the circuit board, the balancing sheet having an axle hole corresponding to an axle hole of the circuit board and notches symmetrical about a center line of the axle hole;
   a stator joined together with the circuit board and the balancing sheet by an axle tube; and
   a rotor having an axle shaft rotatably received in the axle tube, rotation of the axle shaft being controlled by a controlling device, the rotor having an annular permanent magnet with a diameter substantially same as the diameter of the balancing sheet, wherein the permanent magnet and the balancing sheet attract each other, and a gap between the permanent magnet and the balancing sheet remains relatively very small.

3. The brushless D.C. motor assembly as claimed in claim 2, wherein the circuit board is joined to a fixing body.

4. The brushless D.C. motor assembly as claimed in claim 2, wherein the balancing sheet is mounted between the stator and the circuit board.

5. A brushless D.C. motor assembly, comprising:
   a balancing sheet made of material with magnetic conductivity, the balancing sheet having an axle hole and notches symmetrical about a center line of the axle hole;
   a stator joint together with the balancing sheet by an axle tube; and
   a rotor having an axle shaft rotatably received in the axle tube, rotation of the axle shaft being controlled by a controlling device, the rotor having an annular permanent magnet with a diameter substantially same as the diameter of the balancing sheet, wherein the permanent magnet and the balancing sheet attract each other, a gap between the permanent magnet and the balancing sheet remains relatively very small, and the rotor has an integrally formed transmission pulley.

6. The brushless D.C. motor assembly as claimed in claim 5, wherein the balancing sheet is mounted between the stator and the circuit board.

7. The brushless D.C. motor assembly as claimed in claim 6, wherein the circuit board is joined to a substrate.

8. A brushless D.C. motor assembly, comprising:
   a balancing sheet made of material with magnetic conductivity, the balancing sheet having an axle hole and notches symmetrical about a center line of the axle hole;
   a stator joined together with the balancing sheet by an axle tube; and
   a rotor having an axle shaft rotatably received in the axle tube, rotation of the axle shaft being controlled by a controlling device, the rotor having an annular permanent magnet with a diameter substantially same as the diameter of the balancing sheet, wherein the permanent magnet and the balancing sheet attract each other, a gap between the permanent magnet and the balancing sheet remains relatively very small, and the axle shaft protrudes through the axle tube on which a transmission device is disposed.

9. The brushless D.C. motor assembly as claimed in claim 8, wherein the balancing sheet is joined to a circuit board which includes an axle hole for the transmission device of the axle shaft protruding therethrough.

10. The brushless D.C. motor assembly as claimed in claim 9, wherein the circuit board is joined to a substrate which includes an axle hole for the transmission device of the axle shaft protruding therethrough.

11. A brushless D.C. motor assembly, comprising:

a stator having a set of pole pieces, and an axle hole defined in the stator; and a rotor having an axle shaft rotatably received in the axle hole and an annular permanent magnet, wherein the stator is characterized in that one of the pole pieces has integrally formed connecting portions for supporting an annular body which is provided with notches symmetrical about the center line of the annular body and parallel to said one of said pole pieces but not coplanar with said one of said pole pieces, and the annular permanent magnet of the rotor and the annular body attract each other but have no contact therebetween.

12. The brushless D.C. motor assembly as claimed in claim 11, wherein the connecting portions protrude between the pole edges of said pole piece.

13. The brushless D.C. motor assembly as claimed in claim 11 wherein the connecting portions extend from the pole edges of said pole piece.

14. The brushless D.C. motor assembly as claimed in claim 11, wherein the diameter of the annular body is that of said pole piece.

15. The brushless D.C. motor assembly as claimed in claim 11, wherein the annular body comprises symmetrical discontinuous annular plates.

16. The brushless D.C. motor assembly as claimed in claim 11, further comprising a blade wheel disposed on the rotor, the blade wheel having a plurality of blades.

17. A pole piece for a brushless D.C. motor assembly, the pole piece being made of material with magnetic conductivity, and the pole piece having a hole defined therein and a plurality of pole edges, wherein the pole piece has integrally formed connecting portions for supporting an annular body which is provided with notches symmetrical about the center line of the annular body and parallel to the pole piece but not coplanar with the pole piece.

18. The pole piece as claimed in claim 17, wherein the connecting portions protrude between the pole edges of the pole piece.

19. The pole piece as claimed in claim 17, wherein the connecting portions extend from the pole edges of the pole piece.

20. The pole piece as claimed in claim 17, wherein the diameter of the annular body is the largest diameter of the pole piece.

21. The pole piece as claimed in claim 17, wherein the annular body comprises symmetrically discontinuous annular pieces.

* * * * *